United States Patent
Sellin

(10) Patent No.: US 9,875,572 B2
(45) Date of Patent: Jan. 23, 2018

(54) METHOD FOR SIMULATING THREE-DIMENSIONAL DISPLAY ON A TWO-DIMENSIONAL DISPLAY UNIT

(71) Applicant: Adssets AB, Stockholm (SE)

(72) Inventor: Lars-Erik Sellin, Stockholm (SE)

(73) Assignee: ADSSETS AB, Stockholm (SE)

( * ) Notice: Subject to any disclaimer, the term of this patent is extended or adjusted under 35 U.S.C. 154(b) by 0 days.

(21) Appl. No.: 14/958,986

(22) Filed: Dec. 4, 2015

(65) Prior Publication Data

US 2016/0163092 A1  Jun. 9, 2016

(30) Foreign Application Priority Data

Dec. 9, 2014  (SE) ...................................... 1451502

(51) Int. Cl.
*G06T 15/20* (2011.01)
*G06T 3/40* (2006.01)
(Continued)

(52) U.S. Cl.
CPC ......... *G06T 15/20* (2013.01); *G06Q 30/0241* (2013.01); *G06T 3/40* (2013.01); *G06T 15/08* (2013.01); *G06F 2203/04802* (2013.01)

(58) Field of Classification Search
CPC ......... G06F 2203/04802; G06F 3/0483; G06F 3/0485; G06F 3/125; G06T 2200/24; G06T 11/206; G09G 3/003; G09G 5/34
See application file for complete search history.

(56) References Cited

U.S. PATENT DOCUMENTS 6,690,337 B1 * 2/2004 Mayer, III ............ G06F 1/1601
                                                        345/1.1
2002/0113802 A1 * 8/2002 Card ................... G06F 3/04815
                                                        345/619
(Continued)

FOREIGN PATENT DOCUMENTS

EP   1 986 089 A2   10/2008
EP   2 175 358 A2   4/2010

OTHER PUBLICATIONS

Anonymous: 11 Products: ads sets. com 11, Dec. 1, 2014 (Dec. 1, 2014), pp. 1-7, XP055265478, Retrieved from the Internet: URL:https:jjweb.archive.orgjweb/20141201231409/http:jjadssets.comjproducts p. 2.
(Continued)

*Primary Examiner* — Haixia Du
(74) *Attorney, Agent, or Firm* — Gabriela B. Tomescu, Esq.; Bergenstråhle & Partners AB

(57) ABSTRACT

Disclosed is a method for simulating three dimensional display of data. The method comprises obtaining (S100) width and height for an information container, and obtaining (S110) width and height for a virtual three-dimensional display unit. Additionally, the method comprises determining (S120) a number of faces, width and height for each face of the virtual display unit, and an angle between adjacent faces of the virtual display unit. The method further comprises determining (S130) a rotation point, retrieving (S140) data for a first page, and determining (S150) width and height for the data of the first page. The method also comprises inserting (S160) the data of the first page into the first face, and then repeating steps (e) to (g) for each face of the plurality of faces. The final steps are to display (S170) and rotate (S180) the virtual display unit around its rotational axis.

6 Claims, 6 Drawing Sheets

(51) Int. Cl.
    *G06T 15/08*     (2011.01)
    *G06Q 30/02*     (2012.01)

(56) References Cited

U.S. PATENT DOCUMENTS

2011/0286040 A1* 11/2011 Seto ................... G06T 11/60
    358/1.15
2013/0253904 A1* 9/2013 Heller ............ G06F 17/30905
    704/8

OTHER PUBLICATIONS

Adssets—VG: 11Toyota Spincube 11, Aug. 8, 2013 (Aug. 8, 2013), p. 2 pp., XP054976476, Retrieved from the Internet: URL:https:jjwww.youtube.comjwatch?v=BOOmMWe550k [retrieved on Apr. 15, 2016] the whole document.

* cited by examiner

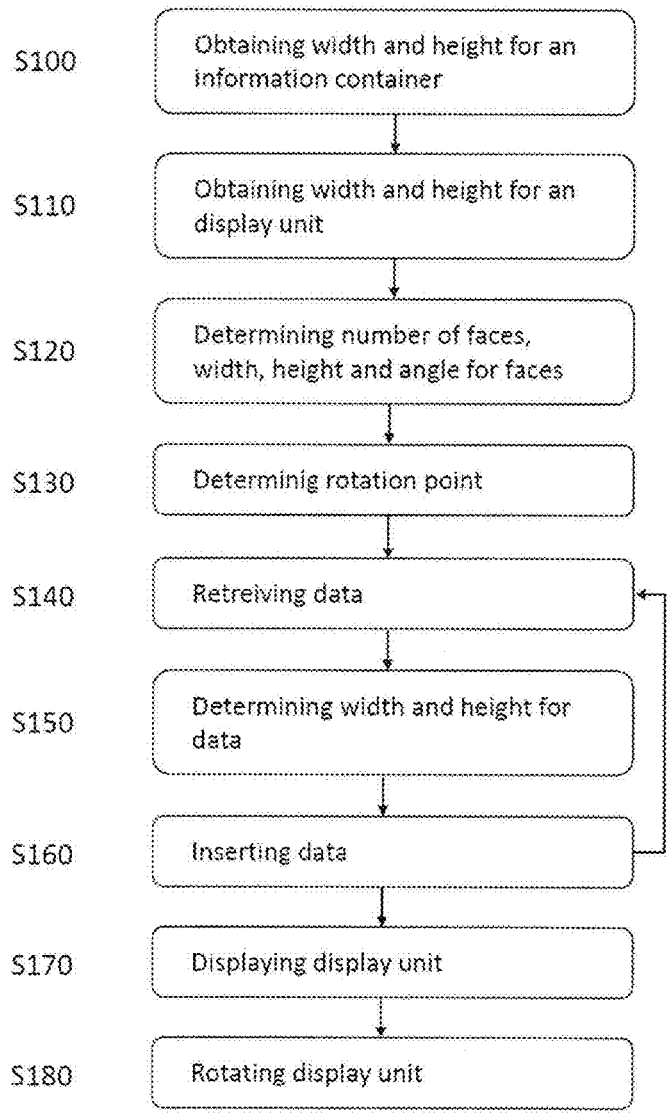

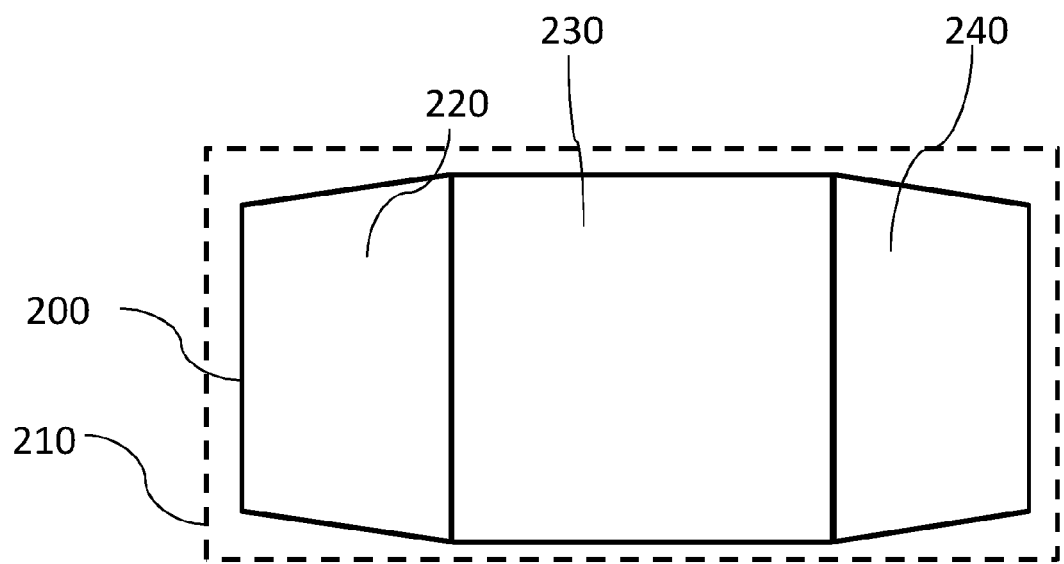
Fig. 2B
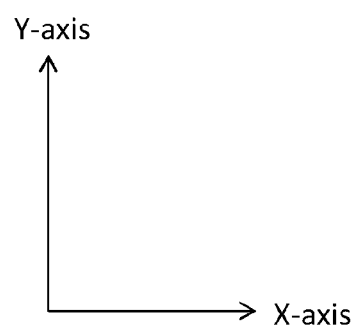

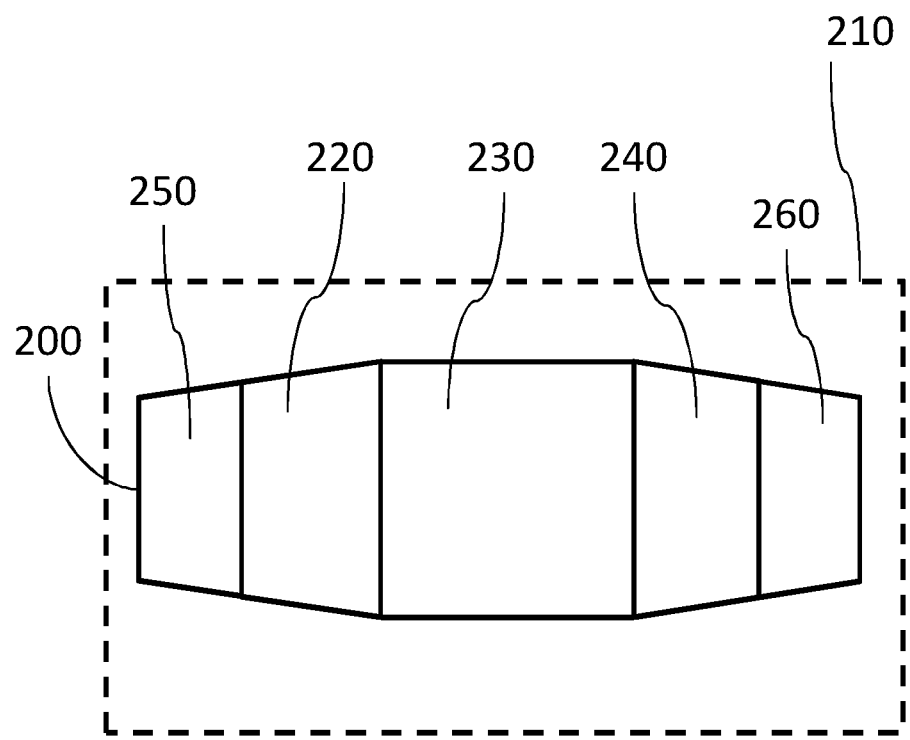
Fig. 2D
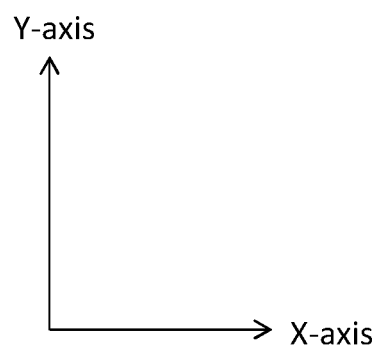

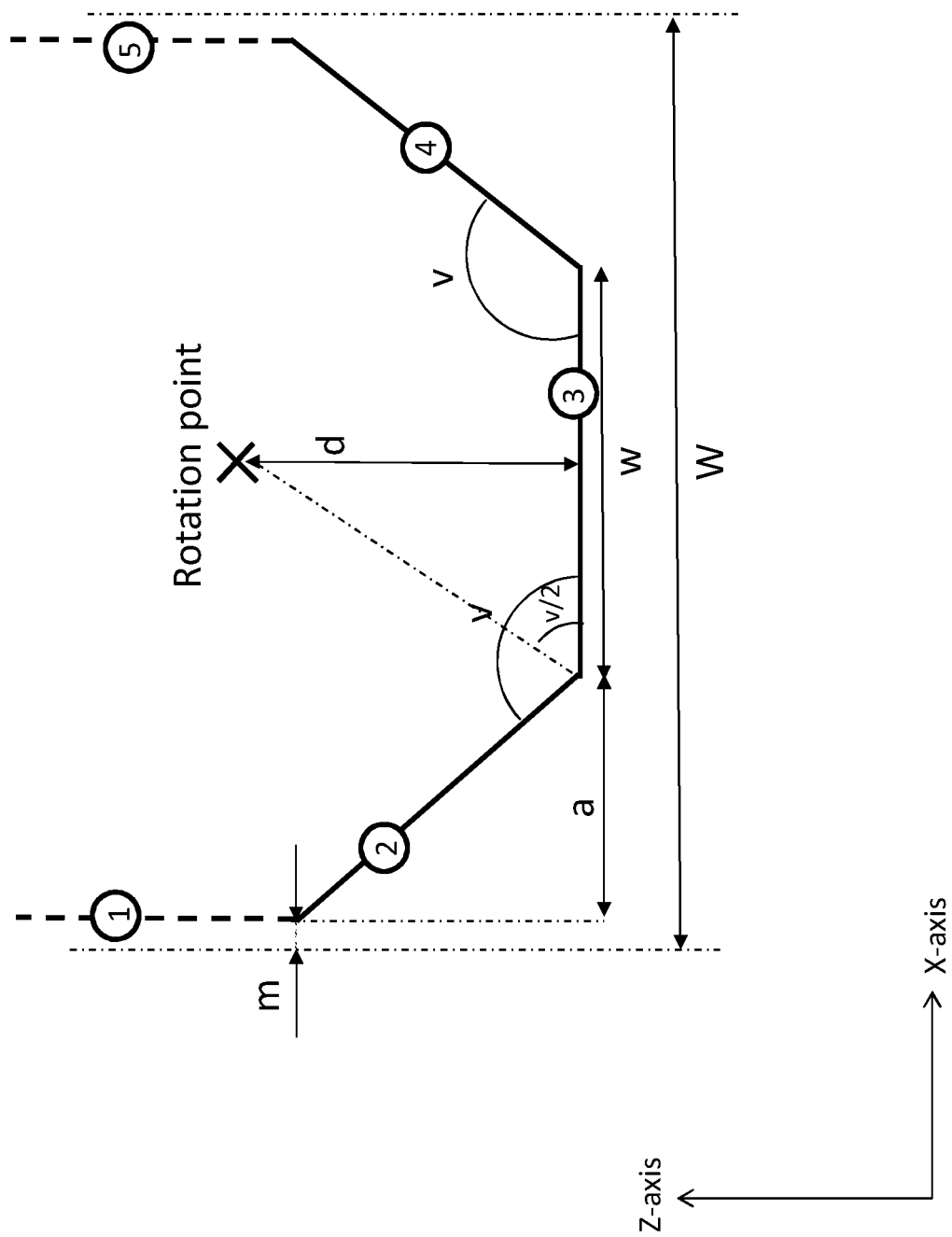

METHOD FOR SIMULATING THREE-DIMENSIONAL DISPLAY ON A TWO-DIMENSIONAL DISPLAY UNIT

This application claims the benefit of Swedish patent application SE 1451502-7, filed Dec. 9, 2015, the entire content of which is hereby incorporated by reference.

TECHNICAL FIELD

The present invention relates to a method and format for simulating three dimensional display of data on a two dimensional display unit.

BACKGROUND

Different ways of displaying electronic information, i.e. data, on a two-dimensional display, such as a Liquid Crystal Display, LCD, are known. Normally data is displayed in two dimensions. One example of data displayed on a display is banners. Generally, a banner is a way of displaying information for use in an environment defined by a publisher, such as a web page or a mobile application. Banners are often represented in two dimensions and are rectangular in shape. Banners may contain content (such as text, pictures, animations or other visual data) within their borders, and are generally shown near a top edge or bottom edge of a viewable portion of the environment.

Further, data may be displayed so as to be interpreted as being three dimensional, 3D, by the viewer. Especially, data may be displayed as to be interpreted as different 3D shapes and forms. For instance, banners may also be three dimensional, and may be shaped as a circle, a square, a sphere or a tetrahedron, for example.

When presenting information, it is usually desirable to be able to present as much data as possible in a limited space. Displaying data to be interpreted as 3d may be beneficial for allowing more data to be displayed in a smaller area on a two dimensional display.

A problem with simulating three dimensional display of data on a two dimensional display is that different users are accessing information from a multitude of different devices with different screen sizes, which may have different operating systems in different versions. It is difficult yet very desirable to display information in a way that is compatible across devices, systems, screen sizes, operating systems and so forth, while still providing a good 3D simulation.

SUMMARY OF THE INVENTION

It is an object of the invention to be alleviate at least some of the problems with prior art. It is further an object able to present multiple kinds of different information on a two-dimensional display, information that will be interpreted as displayed in three-dimensional space, which information can be displayed in a 3D simulation for different sizes of physical 2D displays. In other words, a technical problem solved by the present invention is to be able to present a lot of information of different types on a two-dimensional display. Another problem solved by the present invention is to be able to present information on a two-dimensional display, simulating a three-dimensional representation/presentation.

According to an aspect, a method performed by a computer for simulating three dimensional display of data on a two dimensional display unit is provided, wherein the data is to be displayed on a plurality of faces of a three-dimensional figure simulated by a virtual display unit. The method comprises obtaining width and height of an information container into which the data to be displayed is to be inserted. It further comprises obtaining width and height for a virtual three-dimensional display unit, based on the width and height of the information container, wherein the virtual display unit is arranged to display a number of faces simultaneously. Additionally, the method comprises determining a number of faces, width and height for each face of the three-dimensional figure that is to be simulated by the virtual display unit, and an angle between adjacent faces of the virtual display unit, based on the width and height of the virtual display unit. The method further comprises determining a rotation point for the virtual display unit, around which the virtual display unit is to rotate, retrieving data for a first page of the number of pages from a database associated with the computer, and determining width and height for the data of the first page, based on the width and height of the first face. The method also comprises inserting the data of the first page into the first face of the virtual display unit, and then repeating steps (e) to (g) for each face of the plurality of faces. The final step of the method is then to display the virtual display unit and rotate the virtual display unit around its rotational axis.

By performing a method as described above, it is possible to achieve an adaptive simulated three-dimensional virtual display unit on a two-dimensional display, which automatically adapts itself depending on the size of an information container. It is further possible to display multiple different pages of information on multiple faces simultaneously, thus being able to present a multitude of data simultaneously.

According to an embodiment, the method comprises determining an orientation for the virtual display unit based on the width and/or height of the information container. By determining an orientation, it is possible to maximize the size of the virtual display unit for various types of display units and sizes of display units.

According to another embodiment, the method further comprises maximizing the size of the virtual display unit in relation to the information container, and maximizing the size of the faces of the virtual display unit, as well as maximizing the size of the content of the pages. An advantage with automatically maximizing the sizes is to be able to fit more data into a specific space.

According to another embodiment, the method further comprises preloading each page of the number of pages and its corresponding data from the database when a previous page is shown on a face of the virtual display unit. An advantage with this is to achieve a virtual display unit with a virtually endless amount of pages that is still perceived as a geometrical shape with limited space, such as an octagonal prism.

BRIEF DESCRIPTION OF DRAWINGS

FIG. 1 shows a flow chart of the steps of a method according to the present disclosure.

FIGS. 2A-2D show how a virtual display unit behaves when adapting to different sizes of an information container or display.

FIG. 3 shows how a virtual display unit may be presented and how to calculate the dimensions and positions of the faces.

DESCRIPTION OF EMBODIMENTS

Figure 2A:
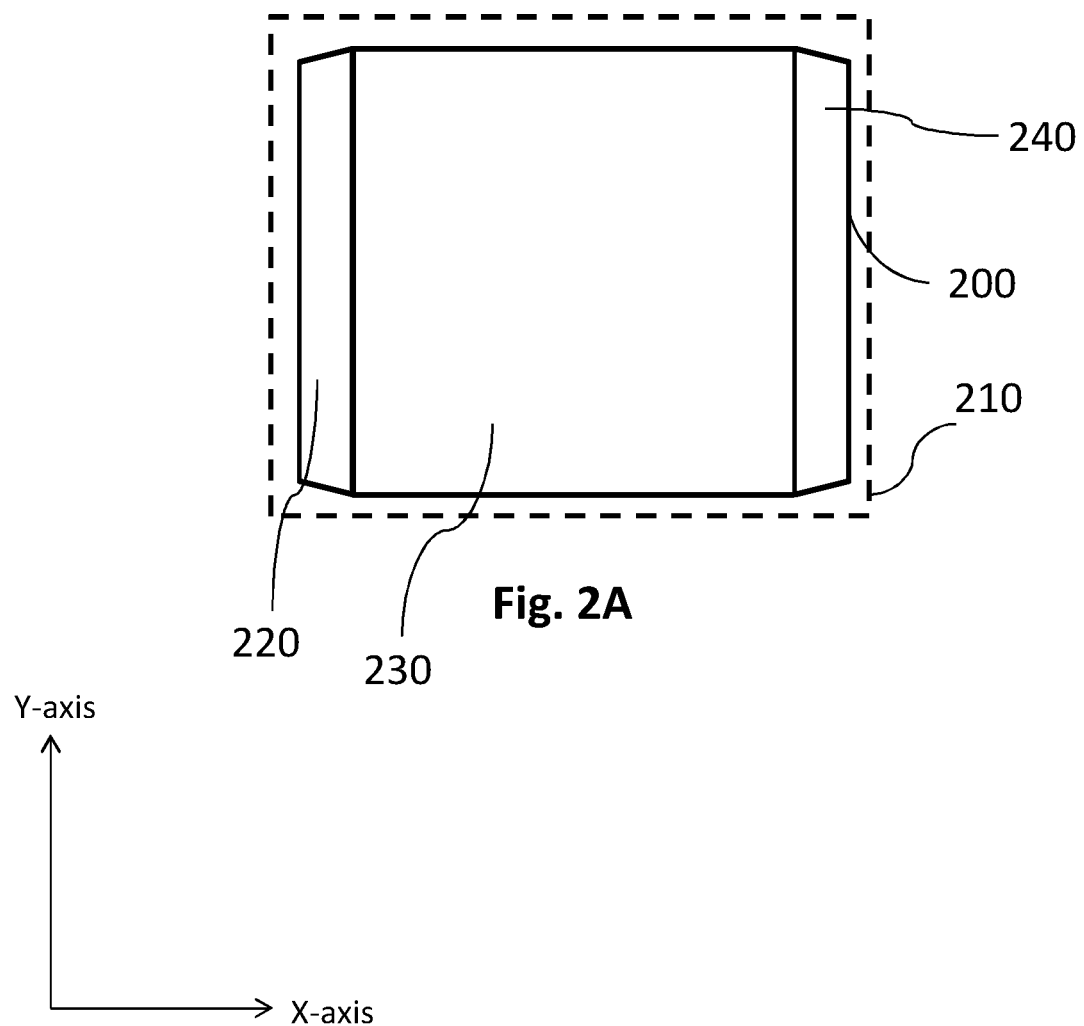

In the following, a detailed description of the different embodiments of the solution is disclosed with reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the implementation.

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer programs described in some embodiments of the present invention may be stand-alone software entities or sub-entities (e.g., subroutines, code objects) of other computer programs. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors and associated memory) programmed to perform the methods described herein, as well as computer-readable media encoding instructions to perform the methods described herein.

Throughout the documents, there are references to width and height of various virtual containers and units. It should be understood that width and height are relative terms that are dependent on how the object is viewed, but for the sake of this disclosure the terms shall be interpreted as relative to how a viewer would perceive them during normal view. For two-dimensional objects, the (virtual) y-axis should be considered as "height" and the (virtual) x-axis should be considered as "width". For three-dimensional objects, the same applies and additionally the (virtual) z-axis represents "depth". Note that the directions of the axes, as shown in figures, may change depending on from which perspective a figure is shown.

The term "user" is intended to denote a person using the herein disclosed method for creating a virtual display unit, and a "viewer" is intended to denote a person viewing the created virtual display unit.

The term "computer" is intended to denote a device comprising a processing device and a memory device operatively coupled to the processing device, preferably associated with a database. A computer may further be connected to other computers, and/or to a computer network, such as the Internet.

Briefly described, the present disclosure relates to a method and computer program product for handling virtual content by a computer. The solution will now be described more in detail with reference to the accompanying drawings.

FIG. 1 shows a method for simulating three dimensional display of data on a two-dimensional screen, performed by a computer, wherein the computer comprises at least a processing device, a memory device operatively coupled to the processing device and at least one database associated with the computer. The method comprises a step S100 of obtaining width and height of an information container, into which a virtual display unit is to be inserted. The information container may be a part of a display area of a device, or it may be the whole display.

This obtaining step S100 may be performed automatically by a computer, or it may be manually controlled by a user. For example, the computer may retrieve information for a previously known information container automatically, or a user may manually enter values for a new information container. In one embodiment, this obtaining step S100 is only related to the width and height of the information container, but it may also be related to the shape of the information container. One way of performing this obtaining step may be to choose between different available information containers, another way is to enter values for the dimensions, e.g. width and height, for the information container. The purpose of step S100 is to define an area where information will be displayed, preferably as a rotating 3D-object with multiple faces. The information container is still, in a typical embodiment, expressed in two dimensions.

An additional step may be performed after step S100, which is used for determining and possibly changing an orientation for the information container, which in turn will determine the orientation of the virtual display unit. This step is applicable when the dimensions of the information container is fixed and predetermined and a creator (user) of a virtual display unit has no control over the dimensions. Also, it is typically applicable when the user knows the dimensions and shapes of the visual data to be inserted into the virtual display unit. In some embodiments, as an example, if the information container is determined to have a greater width than height, the orientation may be changed so that width becomes height and vice versa. In some embodiments, it is possible to slightly alter the dimensions of the information container after choosing an information container with a predetermined size.

A second step S110 is used for obtaining width and height for the virtual display unit that is to be inserted into the aforementioned information container. Like the previous step, step S110 may be performed automatically by a computer, or it may be manually controlled by a user. For example, the computer may retrieve information for a previously known information container automatically, or a user may manually enter values for a new information container. The dimensions of the virtual display unit are based on the dimensions of the information container, and typically the size of the virtual display unit may never be larger than the size of the information container. The dimensions of the virtual display unit are generally expressed in relation to the dimensions of the virtual display unit, so that the dimensions of the faces of the virtual display unit are dynamic and dependent on the dimensions of the information container.

After the dimensions, i.e. width and height, of the virtual display unit have been determined, a step S120 is performed in order to determine width and height for each face of a plurality of faces of the virtual display unit, as well as an an angle to be used between adjacent faces of the virtual display unit. The term face is intended to mean one particular side of the virtual display unit, being shown to a viewer. A face is a flat surface in a three-dimensional figure being simulated, in this case the virtual display unit. In a typical embodiment of the present disclosure, a virtual display unit has three faces visible to a viewer when the virtual display unit is standing still, although more faces may be visible when and if the unit is rotating. It is also possible for it to have more faces, for example five faces comprising one main face and four side faces.

Each face comprises a page, wherein a page means a set of data intended to be displayed on one face. For example, a virtual display unit according to the present disclosure may have three faces showing to a viewer, one main face and two side faces. The data on each face is called a page, and which face a page is displayed on may change, although information of a certain page does not generally change. A simulated three-dimensional virtual display unit according to the present disclosure typically has a number of faces that is shown to a viewer at discrete time intervals with one main face and an even number of opposite side faces, where the main face is intended to be the focus of a viewer. Between these discrete time intervals, i.e. when the virtual display unit is rotating, a different number of faces may be shown.

A typical embodiment of the virtual display unit will, as mentioned, have multiple faces, for example three, visible to a viewer when standing still, although more faces may be visible during rotation of the virtual display unit. One main face will be facing directly at a viewer, and two adjacent side faces will be facing a viewer at an angle. The angle may determine the number of faces that are displayed at the same time to a viewer as well as the size of the faces that are shown to a viewer, and typically the angle will be determined so as to maximize the area of the faces shown to a viewer. In a typical embodiment the angle between all adjacent faces will be the same, in order to achieve a uniform virtual display unit. The virtual display unit may comprise any number of faces, although a preferred embodiment has three faces visible to a viewer. The virtual display unit may also comprise any number of pages. The virtual display unit is typically perceived as an octagonal prism by a viewer, but in reality the virtual display unit does not need to be joined with itself, i.e. meaning that the back of the virtual display unit may be open. In some embodiments, step S120 is further adapted to maximize the dimensions of each face of the virtual display unit, so that it is possible to present as much visual data as possible to a viewer.

In order to achieve a virtual display unit which automatically adapts itself depending on the size of the information container into which it is to be inserted, the dimensions of the faces of the virtual display unit will typically be expressed in relation to the dimensions of the information container, for example the width of a face of the virtual display unit may be expressed as being five millimeter or five pixels from the edge of the information container and the height may be expressed as half the height of the information container. Furthermore, the pages which are displayed on the faces may be expressed in relation to the dimension of the faces.

After determining the dimensions and angles for the faces of the virtual display unit, a rotation point may be determined. The rotation point is intended to be the center point around which the virtual display unit may rotate when displaying it to a viewer. The rotation point may be determined based on the dimensions of the faces of the virtual display unit, and is generally calculated automatically.

Step S140 is then performed, wherein visual data is retrieved from a database associated with the computer by which the method is performed. The retrieved visual data comprises information which is to be displayed to a viewer, and may for instance be promotional material, advertisement material or material related to a special offer such as a limited time discount. After visual data has been retrieved, the dimensions of the visual data are determined. For example, if the retrieved visual data is a two dimensional picture, width and height need to be determined for the visual data. In a typical implementation, the relationship of the dimensions of the retrieved visual data is fixed, but it may also be possible to change width and height independent of one another. A set of retrieved visual data is called a page, and it may comprise one or multiple different visual data.

Typically, the visual data is a two dimensional object and therefore width and height are the only relevant dimensions. The determination of dimensions is based on the size of the face into which the retrieved visual data, i.e. the page, is to be inserted, which in turn is based on the size of the information container into which the virtual display unit is to be inserted. The dimensions of the page with visual data is typically expressed in relation to the first face, e.g. the width may be determined as being 2 cm more narrow than the corresponding face is. This makes it so that the visual data may also, in the same sense as the faces, be a dynamic object that is dependent on the dimensions of the face into which it is inserted, meaning that the size of the visual data changes if it is inserted into a face with different dimensions. In some embodiments, step S150 is further adapted to maximize the dimensions of the visual data of the virtual display unit, so that it is possible to present as much visual data as possible to a viewer.

After the dimensions of the visual data has been determined, the visual data is inserted into the face of the virtual display unit in a step S160. Since the dimensions of the retrieved visual data is expressed in relation to the size of the face into which it is to be inserted, this step may affect the size of the visual data. After the step S150 has been performed for a first visual data, it may be repeated any number of times depending on the number of faces to be filled. The virtual display unit does not have a limited amount of faces, but may be seen as a virtually endless geometrical object that is perceived as an octagonal prism by a viewer. In a typical implementation, the virtual display unit is perceived as an octagonal prism with flat sides.

When the virtual display unit has been created, it is typically presented to a viewer. A preferred way of presenting the information is to show the virtual display unit as a rotating octagonal prism displaying one main face which is presented as being directly in front of a viewer, with one previous face and one upcoming face visible in an angled way in relation to the viewer. FIG. 2 shows how a virtual display unit created as described above is typically presented to a viewer at a given point in time. Typically, the virtual display unit in FIG. 2 is rotating clockwise, although it is also possible for it to rotate counter-clockwise.

Figure 2C:
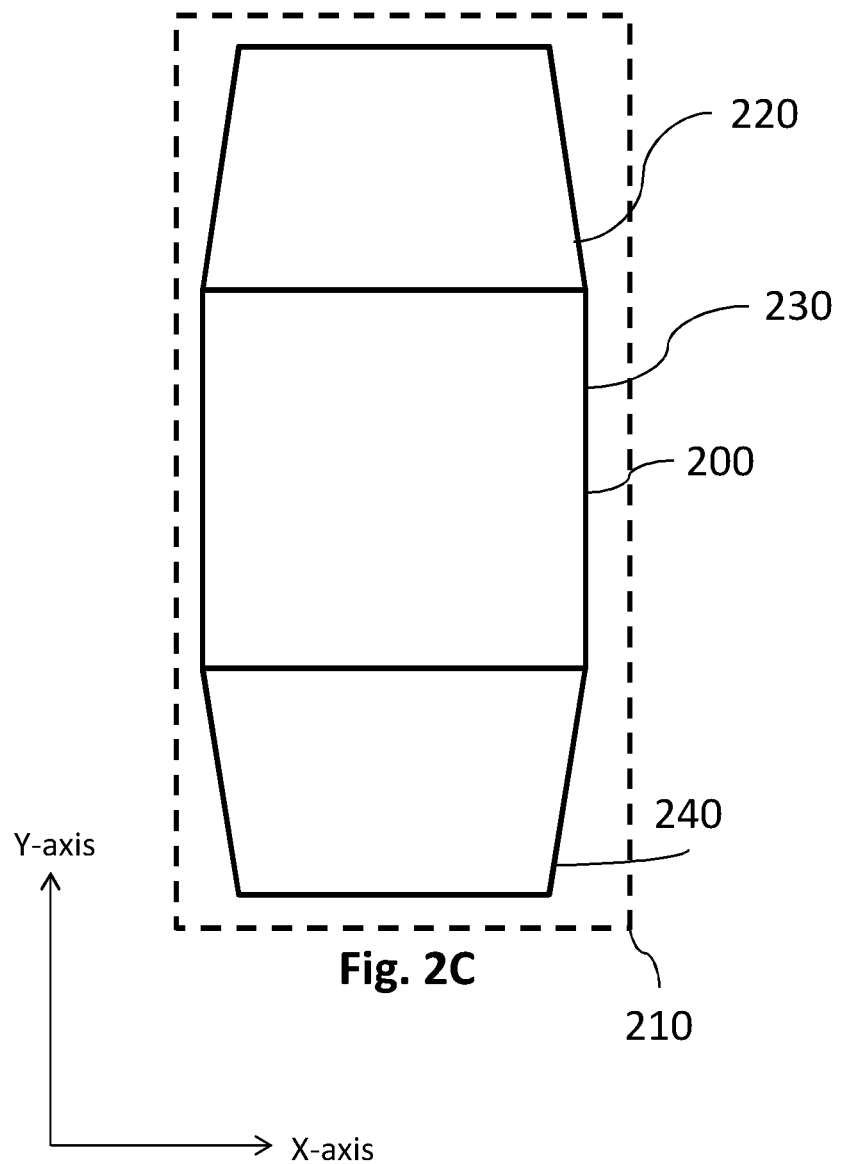

FIG. 2 shows how a virtual display unit 200 according to the present disclosure may automatically adapt itself depending on the size of an information container 210. FIGS. 2a-2d shows the y-axis and x-axis, while the z-axis is not shown since it is the depth dimensions of the figure, i.e. going into the paper. As described previously, the dimensions of the virtual display unit 200 are expressed in relation to an information container 210, and FIG. 2a and FIG. 2b shows how such a virtual display unit 200 changes depending on the size and dimensions of an information container 210 into which it is inserted. Typically, the angle between faces is expressed in relation to the width of the information container. In some implementations, by performing a method according to the present disclosure, by use of a computer network, it is possible to see a preview of the virtual display unit and the information container, as well as the relationship between the two, before choosing a size for the virtual display unit.

An advantage of using the present method becomes apparent when viewing FIG. 2a in relation to FIG. 2b, as the height of the virtual display unit 200 is the same in both figures, but the width differs. According to the present disclosure, new visual data would not need to be rendered in order to accommodate a change in dimensions of the displayed space. This is a common occurrence when for instance turning a phone on the side and viewing in landscape mode rather than portrait mode.

A virtual display unit according to the present disclosure will typically be perceived as rotating, in this example in a clockwise manner. In FIGS. 2a and 2b, one face 230 is the main face, which is being shown to a viewer as being directly in front of them. Face 220 is the previously shown face, and this face is not facing the viewer directly but at an angle. As mentioned, the virtual display unit 200 is typically rotating clockwise, which means that face 240 is the next face to be shown as a main face directly to a viewer. In a typical implementation, the virtual display unit 200 will not be rotating constantly, but instead stay motionless for a predetermined period of time for each main face shown to a viewer, then rotate until the next face is shown directly to the viewer, then stay motionless again, and so on.

FIG. 2c shows an alternative embodiment in which the orientation of the information container has been changed. In some implementations, this may also mean that the virtual display unit, when shown to a viewer, will rotate in another direction in relation to the viewer, although it is still considered to be a clockwise rotation. The denoted faces are the same as in FIGS. 2a and 2b, i.e. face 220 was the face previously show directly to a viewer, face 230 is currently being shown directly to a viewer, and face 240 is the next face to be shown directly to a viewer.

FIG. 2d further shows another alternative embodiment having five faces, one main face 230 and two side faces on each side of the main face, namely faces 220 and 250 on one side, and faces 240 and 260 on the other side. By the virtual display unit having more faces, it is possible to show more pages, and their corresponding data, at the same time, however it may also decrease the size of the faces as compared to a virtual display unit with fewer faces.

In some embodiments, the sizes of the faces of the virtual display unit are repeatedly determined during rotation of the virtual display unit for achieving a uniform virtual display unit.

FIG. 3 shows an example of how the dimensions of the virtual display unit 200 may be calculated in relation to the dimensions of an information container into which the virtual display unit is to be inserted. FIG. 3 shows the z-axis and x-axis, while the y-axis is not shown since it is the depth dimensions of the figure, i.e. going into the paper. Note that FIG. 3 shows z-axis and x-axis while FIGS. 2a-2d shows y-axis and x-axis. It also shows the order in which faces appear to a viewer in a typical implementation. In FIG. 3, the face denoted with 3 is the current main face shown to a viewer of the virtual display unit. Faces 2 and 4 are also visible, but are directly facing the viewer. Considering an example where the virtual display unit of FIG. 3 is rotating, face 2 was the previous face to be aimed directly at the viewer as face 3 is currently being, and face 4 is the next face to be shown in this way. Subsequently, when face 4 rotates to the spot previously occupied by face 3, face 3 rotates to where face 2 was, while face 2 rotates out of sight for a viewer, illustrated in the figure as face 1.

When calculating the dimensions and positions of the virtual display unit as shown in FIG. 3, it is done in three dimensions. An example will now be given as to how this may be calculated with reference to FIG. 3:

The width w and the height h of the pages of the virtual display unit are determined by the user, for example by manually entering values for width and height. The height h is not shown in the figure since FIG. 3 is a horizontal cross-section and not showing the dimension along the y-axis. The width W of the information container is predetermined, though in some embodiments a user may manually enter the width W as well.

Another variable that is determined by the user is denoted as m, which signifies the margin between the edge of the virtual display unit and the information container in a width dimension, i.e. along the x-axis, as evident from FIG. 3. Another margin is determined in the same manner for the height, denoted m', but not shown in the figure due to it being a horizontal cross-section. In some embodiments, m and m' have the same value, and in other embodiments they may differ. Typically, the margins are the first variables to be determined for the virtual display unit, as they determined the difference in dimensions as compared to the information container. Both m and m' are generally determined as to maximize the size of the virtual display unit.

A distance a is also determined, which is the width the two side faces of the virtual display unit will have in a two-dimensional representation of the figure, i.e. as when being viewed by a viewer. The virtual display unit preferably has the shape of a simulated octagonal prism, although it may not have to be connected to itself on a back side. All calculations described are for when the virtual display unit is at a position with one main face facing directly at a viewer and with two side faces showing at an angle to a viewer. In this example, the distance a is determined as $a=(W-w)/2-m$. The height of the side faces are typically the same as the height of the main face.

After determining a, that value is used for determining an angle v between pages of the virtual display unit. In the example, v is calculated as $v=180-\arccos(a/w)$.

So far, the calculations have been possible to do in only two dimensions. After calculating the angles, a distance to a rotation point may be determined. The rotation point is the center around which the virtual display unit will rotate. This distance will be in a depth direction in relation to a viewer, i.e. along the z-axis. The distance d to a rotation point is determined as $d=(w/2)\tan((180-\arccos(a/w))/2)$.

The next step is to calculate the positions of the faces of the virtual display unit, the dimensions are already known at this stage. In this example, the first position to determine is that of face 3. The position of the center of face 3 is determined as W/2, i.e. in the middle of the information container. The position of the center of face 2 is then calculated, and this is once again done in three dimensions, since the center of face 2 will, in three-dimensional space, be behind the center of face 1. Therefore, the position along the x-axis is determined first and then the position along the z-axis afterwards.

The position of the center of face 2 along the x-axis is, in this example for a simulated octagonal prism, determined as $(W/2)+(w+a)/2$, i.e. $(W+w+a)/2$. The position of the center of face 2 along the z-axis is determined as $-(w^2-a^2)^{1/2}/2$, wherein the minus sign denotes that the position along the z-axis is calculated as being away from a viewer. After calculating the position of the center of face 2, a rotation is calculated. As can be seen from FIG. 3, face 2 is not parallel with face 3, which means it has to be rotated before face 2 takes the position of previous face 3. This rotation is determined as rot(y)=arccos(a/w).

The position of face 4 is, as evident from FIG. 3, calculated inversely from face 2. This means that the position along the x-axis is calculated as (W/2)−(w+a)/2, i.e. (W−w−a)/2. The position along the z-axis is calculated in precisely the same way as the position for face 2, i.e. as −(w²−a²)^(1/2)/2. The rotation for face 4 is also calculated inversely from the rotation for face 2, i.e. as rot(y)=−arccos(a/w).

The calculations performed are, as mentioned previously, for positions when the virtual display unit is at a position with one main face facing directly at a viewer and with two face faces showing at an angle to a viewer. When the virtual display unit rotates, the dimensions of the faces change, as can be understood since the dimensions of face 3 and face 2 are different, and when rotating face 3 will at one point have the position face 2 had previously.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more". Moreover, it is not necessary for an apparatus or method to address each and every problem sought to be solved by the presently described concept, for it to be encompassed hereby.

I claim:

1. A method performed by a computer for simulating a three dimensional display of data on a two dimensional display unit, the data being displayed on a plurality of faces of a three-dimensional figure simulated by a virtual display unit, the method comprising the steps of:
   (a) obtaining width and height of a two-dimensional information container into which the data to be displayed is to be inserted;
   (b) obtaining width and height for the virtual display unit, based on the width and height of the information container, the virtual display unit being arranged to display a number of faces simultaneously;
   (c) determining the number of faces for the virtual display unit, width and height for each face of the three-dimensional figure that is to be simulated by the virtual display unit, and an angle between adjacent faces of the virtual display unit, based on the width and height of the virtual display unit;
   (d) determining a rotation point for the virtual display unit, around which the virtual display unit is to rotate;
   (e) retrieving the data for a first page of a number of pages from a database associated with the computer;
   (f) determining width and height for the data of the first page, based on the width and height of a first face of the number of faces;
   (g) inserting the data of the first page into the first face of the virtual display unit;
   (h) repeating steps (e) to (g) for each face of the plurality of faces;
   (i) displaying the virtual display unit and rotating the virtual display unit around its rotation point, wherein the virtual display unit comprises one main face and two side faces and the size of the virtual display unit is calculated according to the following:
   W=width of the information container;
   w=width of a main face of the virtual display unit;
   h=height for a main face of the virtual display unit;
   m=margin between the information container and the virtual display unit;
   a=distance from w to m, i.e. width of a side face in two dimensions;
   v=angle between adjacent faces of the virtual display unit;
   d=shortest distance from the main face of the virtual display unit to a rotation point of the virtual display unit;
   wherein W, w, h and m are determined by a user;
   a is calculated as a=(W−w)/2−m;
   v is calculated as v=180−arccos(a/w);
   d is calculated as d=(w/2) tan((180−arccos(a/w))/2);
   a center position of a main face along the x-axis is calculated as W/2;
   a center position of a first side face along the x-axis is calculated as (W+w+a)/2, and a center position of the first face along the z-axis is calculated as (−(w²−a²)^(1/2))/2;
   a center position of a second side face along the x-axis is calculated as (W−w−a)/2, and a center position of the second face along the z-axis is calculated as (−(w²−a²)^(1/2))/2.

2. The method according to claim 1, wherein each page of the number of pages and its corresponding data are preloaded from the database when a previous page is shown on a face of the virtual display unit.

3. The method according to claim 1, further comprising a step of determining an orientation of the virtual display unit based on the width and/or height of the information container.

4. The method according to claim 1, wherein a rotation for the first side face is further calculated as rot(y)=arccos(a/w); and
   a rotation for the second side face is calculated as rot(y)=−arccos(a/w).

5. A computer program product comprising a non-transitory computer readable medium storing computer instructions for simulating three dimensional display of data on a two dimensional display unit, performed by a computer, the data being displayed on a plurality of faces, the computer comprising a processing device and a memory device, wherein the processing device is configured to execute computer-readable computer instructions for performing a method according to claim 1.

6. A computer-implemented method, employing at least one processor, for simulating three dimensional display of data on a two dimensional display unit, the data being displayed on a plurality of faces of a three-dimensional figure simulated by a virtual display unit, wherein the method comprises the steps of:
   (a) obtaining width and height of a two-dimensional information container into which the data to be displayed is to be inserted;
   (b) obtaining width and height for a virtual three-dimensional display unit, based on the width and height of the information container, the virtual display unit being arranged to display a number of faces simultaneously;
   (c) determining a number of faces for the virtual display unit, width and height for each face of the three-dimensional figure that is to be simulated by the virtual display unit, and an angle between adjacent faces of the virtual display unit, based on the width and height of the virtual display unit;

(d) determining a rotation point for the virtual display unit, around which the virtual display unit is to rotate;

(e) retrieving data for a first page of a number of pages from a database associated with a computer;

(f) determining width and height for the data of the first page, based on the width and height of a first face of the number of faces;

(g) inserting the data of the first page into the first face of the virtual display unit;

(h) repeating steps (e) to (g) for each face of the plurality of faces;

(i) displaying the virtual display unit and rotating the virtual display unit around its rotational axis, wherein the virtual display unit comprises one main face and two side faces and the size of the virtual display unit is calculated according to the following:

$W$=width of the information container;
$w$=width of a main face of the virtual display unit;
$h$=height for a main face of the virtual display unit;
$m$=margin between the information container and the virtual display unit;
$a$=distance from $w$ to $m$, i.e. width of a side face in two dimensions;
$v$=angle between adjacent faces of the virtual display unit;
$d$=shortest distance from the main face of the virtual display unit to a rotation point of the virtual display unit;

wherein $W$, $w$, $h$ and $m$ are determined by a user;

$a$ is calculated as $a=(W-w)/2-m$;

$v$ is calculated as $v=180-\arccos(a/w)$;

$d$ is calculated as $d=(w/2)\tan((180-\arccos(a/w))/2)$;

a center position of a main face along the x-axis is calculated as $W/2$;

a center position of a first side face along the x-axis is calculated as $(W+w+a)/2$, and a center position of the first face along the z-axis is calculated as $(-(w^2-a^2)^{1/2})/2$;

a center position of a second side face along the x-axis is calculated as $(W-w-a)/2$, and a center position of the second face along the z-axis is calculated as $(-(w^2-a^2)^{1/2})/2$.

* * * * *